C. B. FIELDS.
CALIPER.
APPLICATION FILED DEC. 23, 1918.
1,325,631.
Patented Dec. 23, 1919.
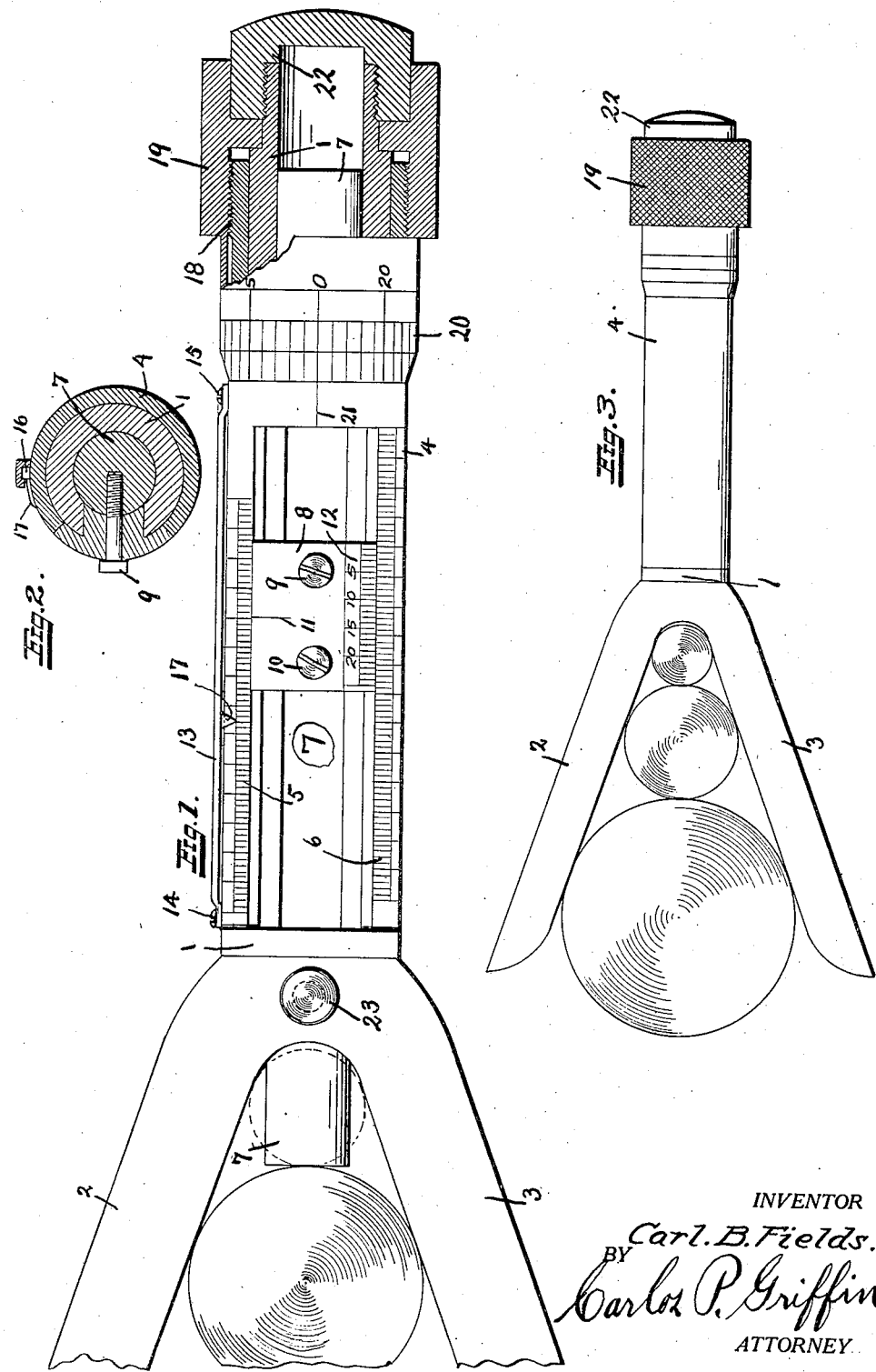
INVENTOR
Carl. B. Fields.
BY
Carlos P. Griffin
ATTORNEY

UNITED STATES PATENT OFFICE.

CARL B. FIELDS, OF VALLEJO, CALIFORNIA.

CALIPER.

1,325,631.  Specification of Letters Patent.  Patented Dec. 23, 1919.

Application filed December 23, 1918. Serial No. 267,960.

*To all whom it may concern:*

Be it known that I, CARL B. FIELDS, a citizen of the United States, residing at Vallejo, in the county of Solano, State of California, have invented a new and useful Caliper, of which the following is a specification in such full and clear terms as will enable those skilled in the art to construct and use the same.

This invention relates to a micrometer caliper especially adapted to the measurement of the diameter of objects while running in a lathe or other piece of apparatus requiring such measurement while in motion.

One object of the invention is to produce a micrometer which will be capable of making very accurate measurements owing to the spacing apart of the graduations of the scale by reason of the fact that the measurements are given by a V shaped fork which contacts with the object to be measured while another gage projects against said object while it is in engagement with the fork to determine its position in said fork.

Another object of the invention is to provide a micrometer caliper with two reading scales, one of which will give extremely accurate readings and the other will give quick readings where the extreme accuracy is not required.

A further object of the invention is to provide a gage at the side of the scale which will enable the user of the micrometer to determine how close he is working toward a given diameter, which gage he may set at the side of one of the scales.

From the foregoing, it will be seen that the principal feature of the invention lies in the fact that the caliper is designed to give the diameter of any cylindrical object contacting with three points thereof, thereby making it unnecessary to seek opposite points of the object when measuring it.

A further object of the invention is to anable the user to determine the correct diameter of objects revolving in a lathe without the loss of time required in stopping the lathe and the rotating object.

Another object of the invention is to produce a caliper which will have a very considerable range of measurement, which instrument in practice, has a range of two to three inches, or greater, as may be desired.

Other objects of the invention will appear as the description proceeds.

An embodiment of the invention is shown in the drawings in which the same reference numeral is applied to the same portion throughout, but I am aware that there may be modifications thereof.

Figure 1 is a plan view of the caliper with its measuring arms broken away for purposes of illustration, Fig. 2 is a sectional view of the handle of the caliper, Fig. 3 is a view looking in the opposite direction from Fig. 1 of a slightly smaller caliper than the one shown in Fig. 1.

The caliper comprises a tubular shank 1 which has two arms 2 and 3 connected therewith, which have hardened faces to contact with the objects to be measured.

Surrounding the tubular shank 1 is a slotted sleeve 4 which sleeve has graduations 5 on one side of its slot, and 6 on the other side of the slot. The distances between the graduations 5 and 6 are so proportioned that each one of the graduations, with respect to the movement of the plunger 7 slidable within the tube 1 in its relation to the arms 2 and 3, will represent a difference of one-fortieth (1/40) of an inch. It is to be noted that these graduations are not one-fortieth (1/40) of an inch apart, but are of such a length that when a rod one-fortieth (1/40) of an inch less in diameter than another rod is placed between the arms 2 and 3 that the difference in size will be indicated by means of the graduations 5 or 6.

The plunger 7 has a scale plate 8 secured thereto by means of two screws 9 and 10, and is slidable in the slot of the tube 1 and of the surrounding sleeve 4 with its outer surface coincident with the periphery of the sleeve 4.

The scale plate 8 has a single line 11 on one side and a vernier reading scale 12 on the other side, to enable it to be read as will be explained later.

On one side of the sleeve 4 there is a grooved slide cover 13 which is secured to sleeve 4 by means of two screws 14 and 15; said slide cover holding a slide 16 in place which slide has an indicating hand to enable the user to set any given mark that he desires to work to, upon the scale 5.

The outer end of the tubular member 4 is threaded as indicated at 18 and a milled head 19 is threaded thereon, which milled head carries a graduated thimble 20. Said thimble is used in conjunction with the line 21 on the tubular sleeve 4. The milled head 19 is held in a fixed position longitudinally, although it may be rotated by means of a cap 22 which is secured on the outer end of the tube 1.

In order to fix the plunger 7 in a given position, a set screw 23 is used.

In operation, the fork is placed over the object to be measured, as illustrated in Figs. 1 and 3, and the plunger 7 pushed out until it contacts with the rotating object to be measured. The set screw 23 is then tightened against the plunger 7 and the instrument is removed from the work, whereupon the milled head 19 will be turned to draw the sleeve 4 away from the fork until a line of the scale 5 corresponds with the line 11 on the scale plate 8. The amount necessary to produce this will be less than one turn of the milled head 19 which is threaded on to the sleeve 4 with threads of the same pitch as the spacing of the scale graduations 5, and the number indicated on the scale 20 will give the thousandths of an inch over the even fortieth shown by the scale 5.

The vernier scale 12 may be used for quick readings if desired, although the scale 20 will give slightly more accurate readings than the readings of the scale 12, since the distances between its lines are greater.

The caliper may also be used by placing the rigid V shaped fork over the object to be measured, the plunger being then gently pushed against the piece, or pushed by the rotating piece, out as far as the object may push it, whereupon the reading is taken from the scale or vernier.

Having thus described my invention what I claim as new and desire to secure by Letters Patent of the United States is as follows, express reservation being made of permissible modifications:

1. In a caliper, a rigid fork, a plunger adapted to contact with a body being measured in the fork to determine its depth therein, a scale carried by the plunger, and a movable scale adjacent the latter scale for determining the diameter of the object in the fork.

2. In a caliper, a rigid fork adapted to span an object to be measured, a slidable plunger for determining the diameter of the body being measured between the arms and the fork, a scale carried by the plunger, a movable scale adjacent the plunger scale, means to move the latter scale including a thimble carrying a micrometer scale to determine the smaller divisions of the movable scale.

3. In a caliper a rigid fork adapted to span an object to be measured, a plunger adapted to contact with said object to determine its size, means carried by the fork to hold the plunger in a fixed position, a scale carried by the plunger, a movable scale adjacent the plunger scale, and means to move the latter scale including a graduated micrometer thimble to determine finer graduations of the movable scale.

4. In a caliper, a rigid fork, a plunger for determining the size of objects placed in the fork, means to hold the plunger in a fixed position, a scale plate carried by the plunger, a movable scale at the side of the scale plate, an indicating pointer slidable along the latter scale, and means including a graduated micrometer scale for shifting the movable scale to determine finer readings thereof.

In testimony whereof I have hereunto set my hand this 13" day of December A. D. 1918.

CARL B. FIELDS.